(No Model.) 8 Sheets—Sheet 1.

P. VAN GELDER.
DUST COLLECTOR.

No. 326,176. Patented Sept. 15, 1885.

Fig. 1.

Witnesses.
Jas. F. Duhamel.
Walter S. Dodge.

Inventor.
Peter Van Gelder,
by Dodgeson,
Attys.

(No Model.)

P. VAN GELDER.
DUST COLLECTOR.

No. 326,176. Patented Sept. 15, 1885.

Fig. 2.

Witnesses:
Jas. P. DuHamel
Walter S. Dodge

Inventor.
Pieter Van Gelder,
by Dodge & Son,
Attys (No Model.)  P. VAN GELDER.  8 Sheets—Sheet 3.
DUST COLLECTOR.

No. 326,176.  Patented Sept. 15, 1885.

Witnesses
Jas. F. DuHamel
Walter S. Dodge.

Inventor
Pieter Van Gelder,
by Dodge & Son,
Attys.

(No Model.)

P. VAN GELDER.
DUST COLLECTOR.

No. 326,176. Patented Sept. 15, 1885.

Witnesses.
Jas. F. DuHamel
Walter S. Dodge

Inventor.
Pieter Van Gelder,
by Dodge & Son,
Attys.

(No Model.) 8 Sheets—Sheet 5.
P. VAN GELDER.
DUST COLLECTOR.

No. 326,176. Patented Sept. 15, 1885.

Witnesses.
Jas. F. Duhamel.
Walter S. Dodge.

Inventor.
Pieter Van Gelder,
by Dodge & Son,
Attys.

(No Model.) 8 Sheets—Sheet 6.

P. VAN GELDER.
DUST COLLECTOR.

No. 326,176. Patented Sept. 15, 1885.

(No Model.) 8 Sheets—Sheet 8.

P. VAN GELDER.
DUST COLLECTOR.

No. 326,176. Patented Sept. 15, 1885.

Witnesses:

Inventor:
Pieter Van Gelder,
by Dodge Son,
Attys.

United States Patent Office.

PIETER VAN GELDER, OF SOWERBY BRIDGE, COUNTY OF YORK, ENGLAND.

DUST-COLLECTOR.

SPECIFICATION forming part of Letters Patent No. 326,176, dated September 15, 1885.

Application filed November 12, 1883. (No model.) Patented in England October 20, 1883, No. 4,998; in France November 16, 1883, No. 158,591; in Belgium November 17, 1883, No. 63,242; in Italy November 20, 1883, No. 16,122; in Germany December 1, 1883, No. 28,517, and in Austria-Hungary November 7, 1884, No. 12,117 and No. 51,333.

*To all whom it may concern:*

Be it known that I, PIETER VAN GELDER, a subject of the King of the Netherlands, residing at Sowerby Bridge, in the county of York, Kingdom of England, have invented certain new and useful Improvements in Dust-Collectors, (for which I have received Letters Patent in England October 20, 1883, No. 4,998; in France November 16, 1883, No. 158,-591; in Belgium November 17, 1883, No. 63,242; in Italy November 20, 1883, No. 16,122; in Germany December 1, 1883, No. 28,517, and in Austria-Hungary November 7, 1884, No. 12,117 and No. 51,333,) of which the following is a specification.

My invention relates to dust-collectors; and it consists in various improvements, hereinafter fully pointed out and claimed.

In the accompanying drawings, Figs. 6 to 12, inclusive, detail views of the valves.

It is now well and generally understood that the presence of the fine dust in the atmosphere of mills, warehouses, and industrial works in general, is not merely a serious inconvenience, but is a source of danger as well, since it in many cases forms, with the air, an explosive mixture. Many serious explosions and conflagrations are clearly traceable to the presence of such dust in the atmosphere of the mill or building. In flour-mills it has long been customary to carry the dusty air to a stive-room where the dust is allowed to settle and the purified air allowed to pass off.

My invention, while particularly designed to supersede the stive-room, will be found of great value in warehouses and industrial works of all kinds where dust-laden air is required to be purified.

The invention may be best explained in connection with the annexed drawings, which illustrate the improvements applied to a flour-mill in lieu of the ordinary stive-room, and may be briefly described as consisting of a series of separate circular chambers superimposed one upon another and each containing a corrugated or zigzag filter, means for producing a current of air downward through an opening at the center of each filter, thence upward through the filtering material and out of the machine, inlet and outlet valves, a heater or drier for drying the current of air, and means for passing said current through the separate filters in a reverse direction to the travel of the ordinary current, and mechanism for controlling the valves and admitting the reverse currents when the main current is shut off, said mechanism being so arranged that but one chamber or section shall be thrown out of action at a time.

Figure 1:
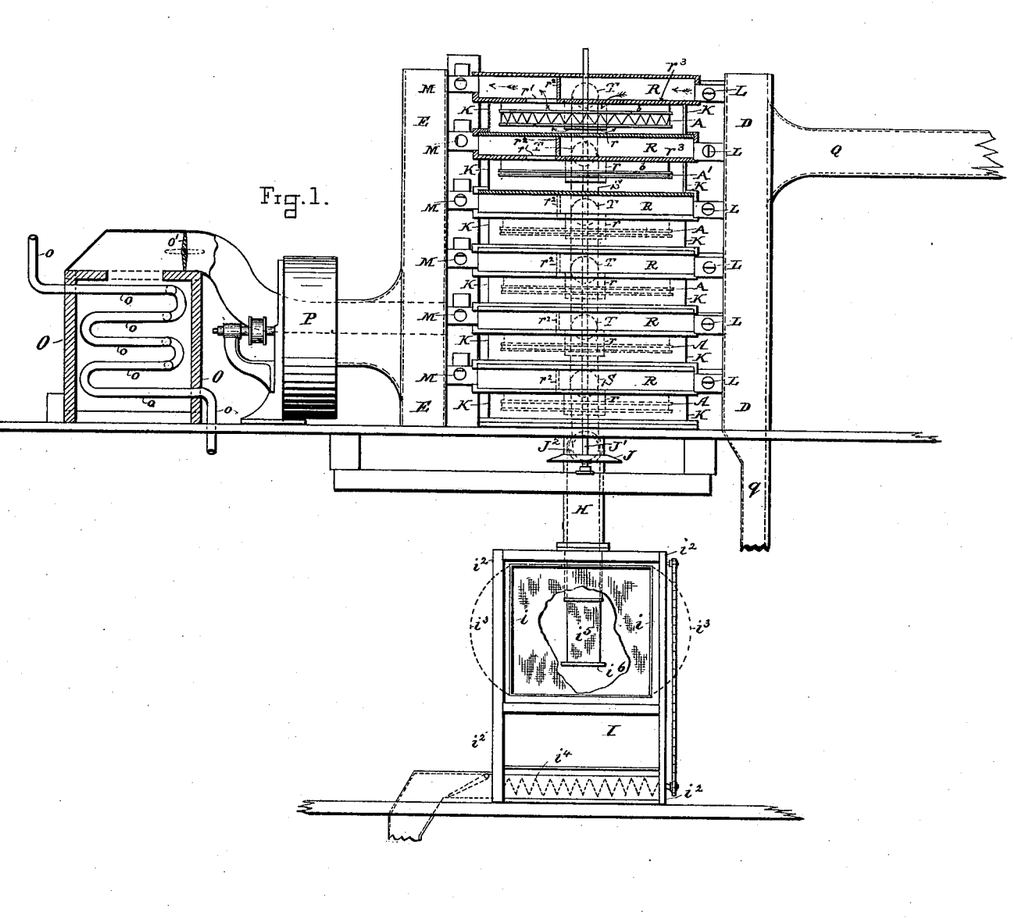
Figure 1 represents a side elevation of my improved apparatus, partly in section.
Figure 2:
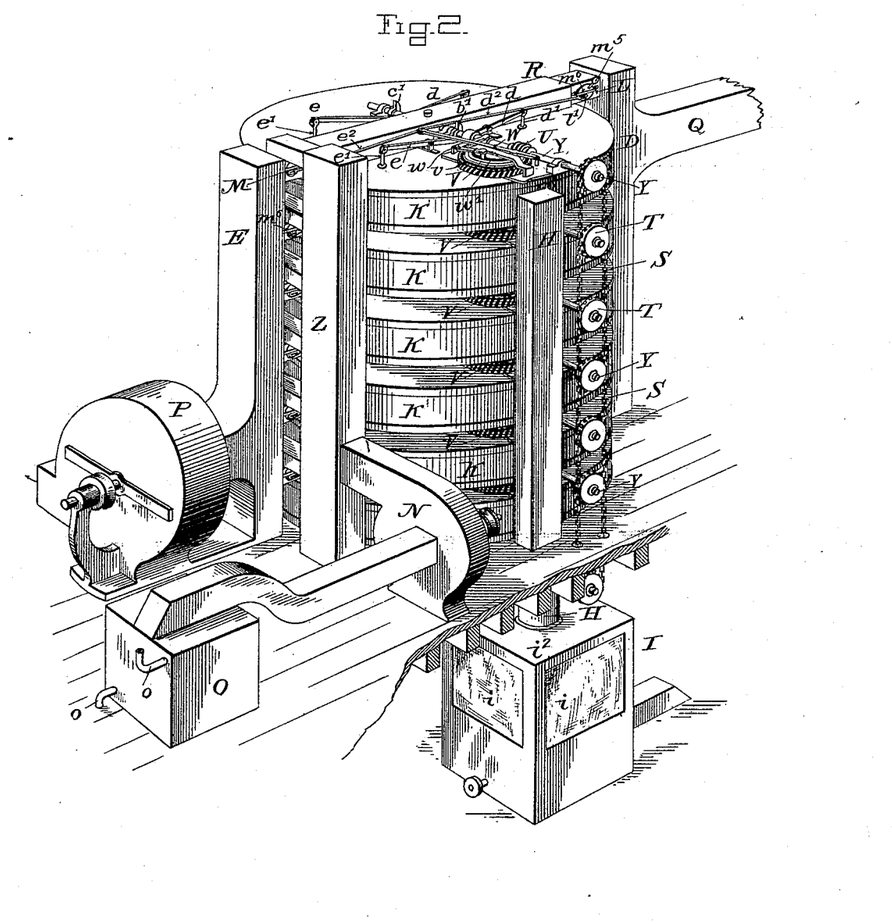
Fig. 2, a perspective view of the apparatus.
Figure 3:
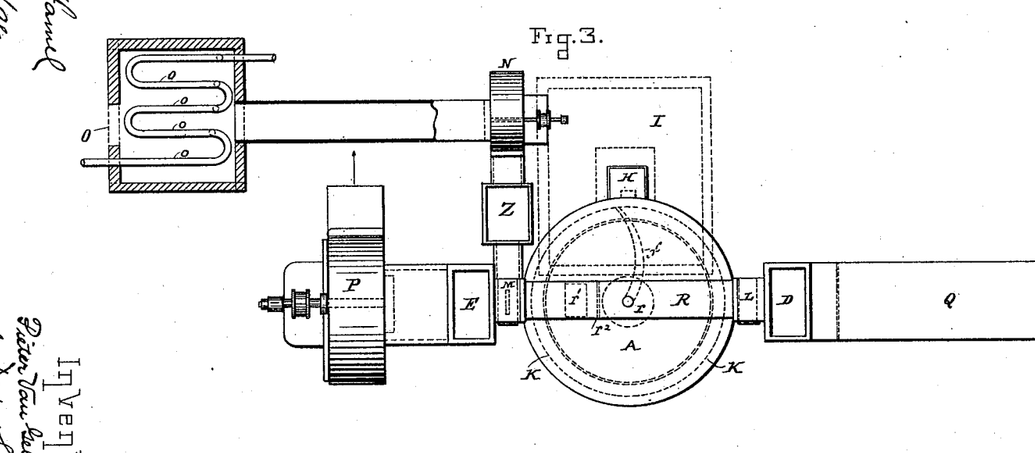
Fig. 3, a plan view of the apparatus, partly in section.
Figure 5:
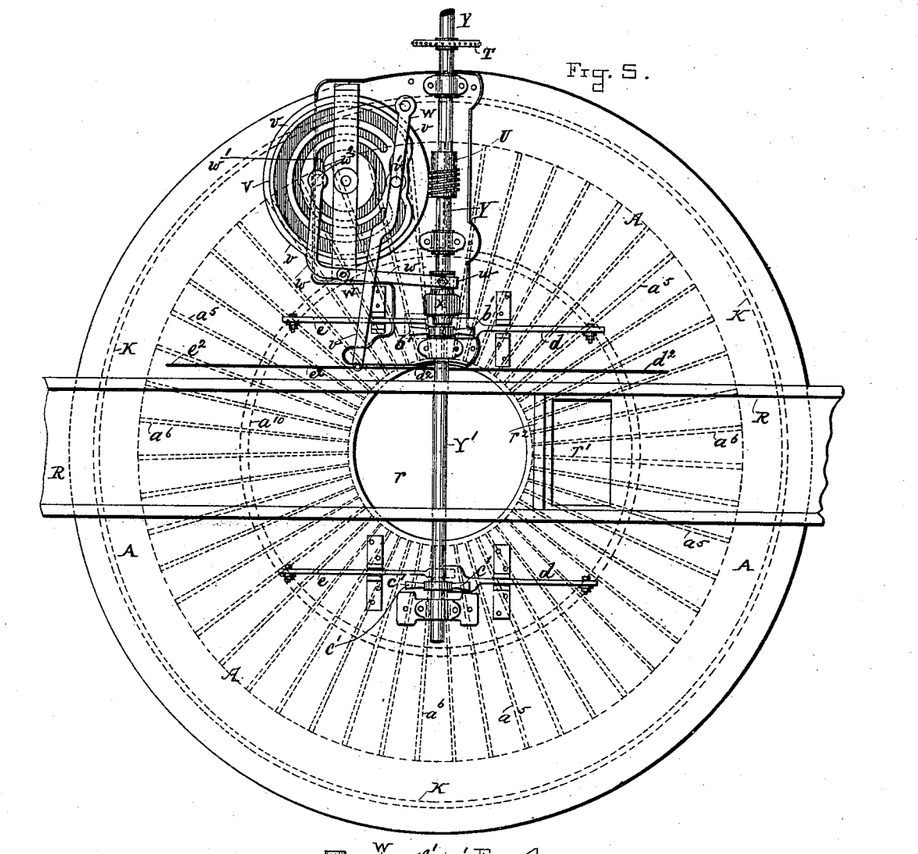
Fig. 5, a top plan view of the same, showing the mechanism for jarring and cleaning the filters and controlling the valves.
Figure 18:
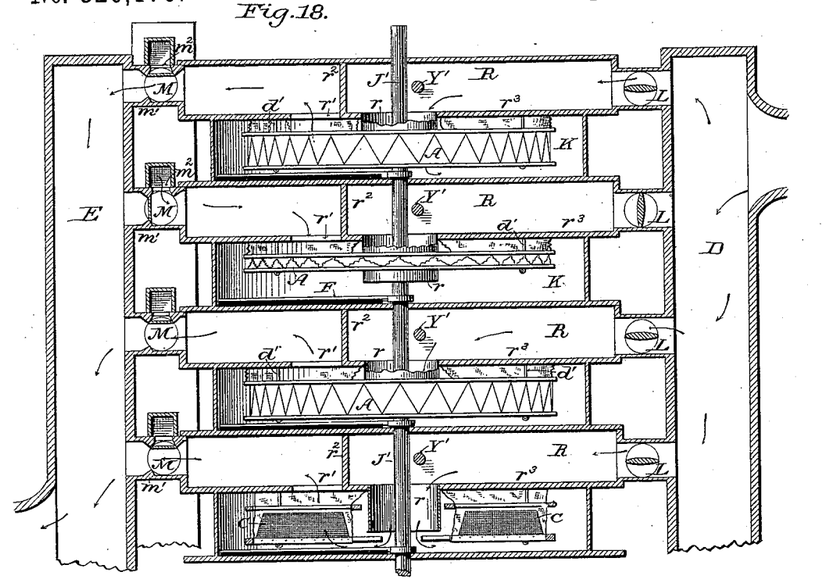
Fig. 18, a sectional view through a series of the filtering-chambers, showing the arrangement of valves, air-passages, &c.

Referring now to the drawings, A indicates a filter or screening device for intercepting the particles of dust and floating matter carried by the air, which filter may be considerably varied in construction. It is arranged within a tight box or casing, K, and is furnished with knocking or with shaking mechanism the latter being shown in the drawings. A series of boxes or chambers, K, are built one above another, producing a tall upright casing, as in Figs. 1, 2, and 18, and each chamber is furnished with a filter, A. Each chamber K is divided by a horizontal diaphragm, $r^3$, as shown in Fig. 1, into separate compartments, and across the upper side of each compartment extends a trunk, R, through which the dust-laden air-current is admitted to the filtering-chamber and the purified current is permitted to escape, each trunk R having at its lower side a circular opening from which a sleeve or tube, $r$, extends down into the filter-chamber K, as shown in Figs. 1, 15, and 18. A transverse partition or diaphragm, $r^2$, placed within each trunk R, prevents the passage of air directly through it and insures the descent of the air-current through sleeve or tube $r$, which is of much larger diameter than the central shaft, J', which passes vertically through the casing from top to bottom, and carries a series of scrapers, as hereinafter described. The dust-laden air thus entering the chambers K passes beneath the filters A, upward through the same, and finally into trunks R, in rear of partitions $r^2$, through openings $r'$ made for the purpose, as shown in Figs. 1, 5, and 13.

Referring now to Figs. 13 to 17, inclusive, the construction of the filters will be explained.

Each filter A consists, essentially, of an upper and a lower skeleton frame, and suitable filtering cloth or material extending from the spokes or radial bars of one frame to those of the other. As shown in Figs. 5, 13, 14, and 15, the upper frame consists of an inner ring or hoop, $a$, and an outer ring or hoop, $a'$, of iron or other suitable material, connected by radial spokes or bars $a^5$, preferably of round rod-iron. The lower frame is substantially the same in construction, consisting of an inner hoop, $a^2$, and outer hoop or ring, $a^3$, and connecting spokes or bars $a^6$, preferably, though not necessarily, of wood. The spokes and hoops may be united by screws $a^4$ or any other convenient fastening, as shown in Figs. 14 and 15.

Figure 13:
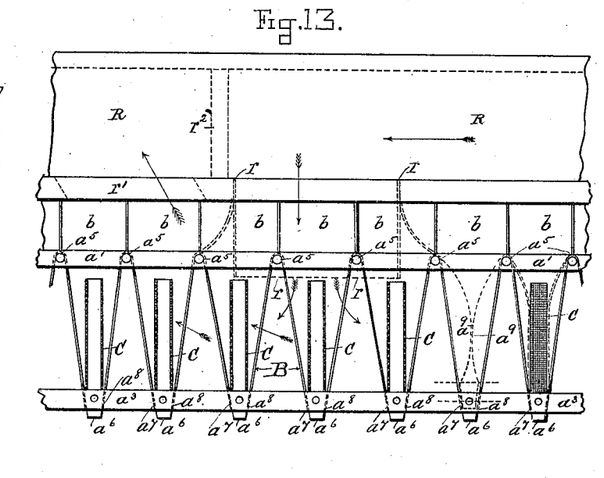
Figs. 13, 14, 15, and 16, enlarged or detail views of one of the filters.
Figures 14, 15, 16, 17:
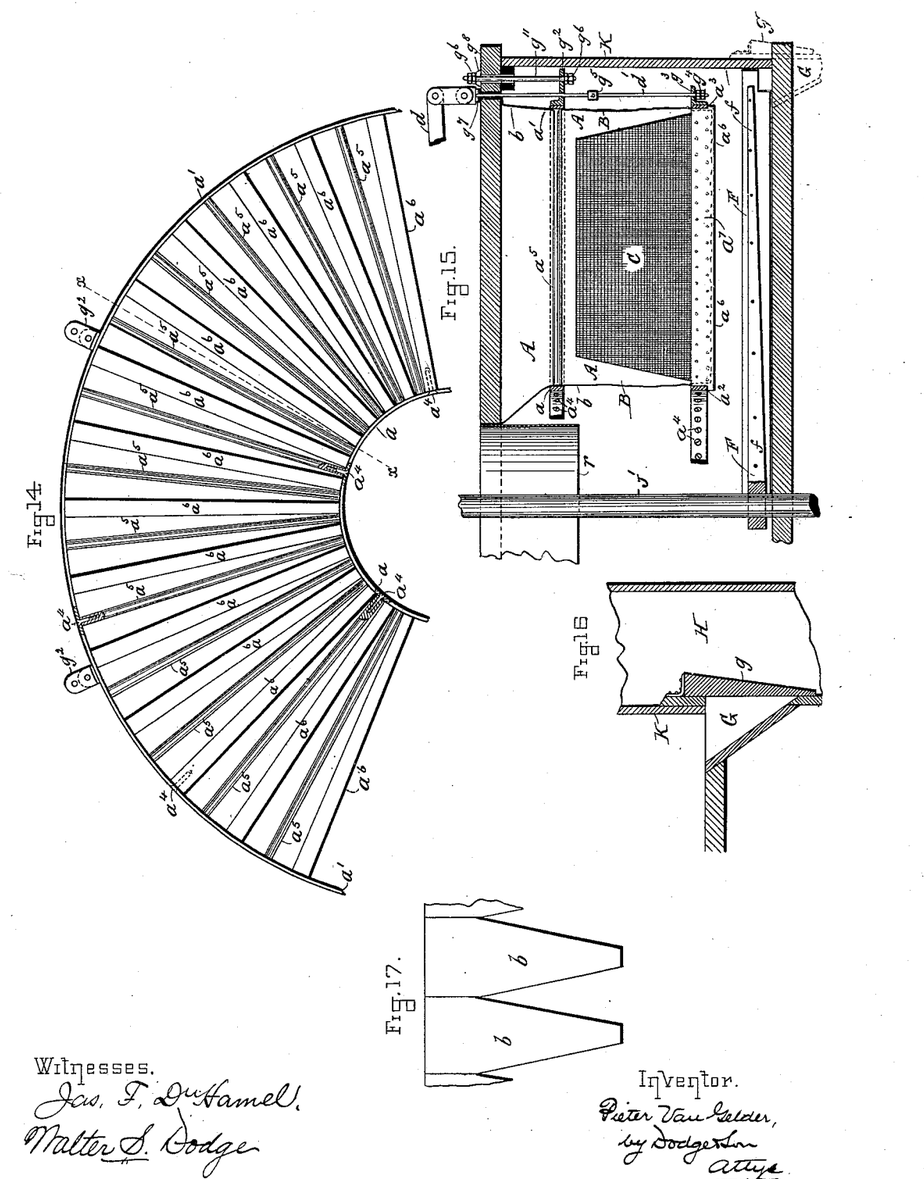
Fig. 17, a face view of the material as cut to cover the ends of the filter-sections.

B indicates filtering material, which may be flannel, gauze, or other porous goods, which is cut into pieces of suitable length, tacked to one side of spoke $a^6$ of the lower head or frame, as at $a^7$, Fig. 13, thence carried upward over a rod or spoke, $a^5$, of the upper frame, and finally downward to the next spoke of the lower frame, to which it is tacked, as at $a^8$, in the same manner as the first end. This is repeated all around the frames, which have an equal number of spokes or radial bars, those of the upper frame being arranged in vertical planes falling midway between those of the lower frame, so that a zigzag surface or series of surfaces is produced. The V-shaped space included between the spokes of the lower frame and the filtering cloth or material extending upward therefrom to the spokes or bars of the upper frame are closed by pieces $b$ of the filtering material of the shape shown in Fig. 17, said pieces being extended above the upper frame and tacked or otherwise made fast to the top of the chamber or casing K, thereby forming a circular chamber above the upper frame with sides of filtering material, which prevents the entering of dusty air above the frames.

If the filtering-cloth be left unsupported from the upper to the lower frame, a strong upward current of air is liable to force or draw two opposite faces into contact, as indicated by dotted lines, as at $a^9$, Fig. 13, thereby rendering a large portion of the filtering-surface useless. To prevent this I place within each V-shaped section of the filter, conveniently upon the spoke or bar $a^6$ thereof, a cage, C, of brass or copper wire, which holds the surface of the cloth apart, as shown in Figs. 13 and 15. If drawn against this cage by the force of the air-current, the filtering cloth or material will still permit the air to pass freely through the entire surface, room being thus left for the air to pass away through the cage.

Figure 4:
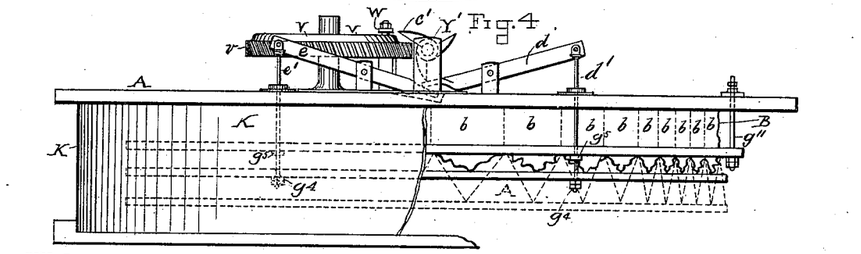
Fig. 4, a side elevation of one section or chamber of the apparatus with the side partly broken away.

As shown in Figs. 4, 14, and 15, the outer hoops or rings, $a'$ and $a^3$, of each filter A are provided with ears $g^2$ and $g^3$, by which said hoops are suspended from the top of the casing of chamber K in which the filter is placed. The upper hoop, $a'$, is suspended by rods $g^{11}$, which pass upward through the top of the casing, and are provided at their upper and lower ends with check-nuts $g^6$, those at the upper end preferably resting upon elastic washers $g^8$, Fig. 15, which prevent noise or jar when the filter is jarred or shaken, as presently explained. The lower hoop or ring, $a^3$, is suspended by rods $d'$ $e'$, as shown in Figs. 2, 4, 5, and 15, carrying check-nuts $g^4$ at their lower ends beneath the ears $g^3$, through which the rods pass, as shown in Fig. 15, and connected at their upper ends by links or couplings to the outer ends of pivoted arms or levers $d$ $e$, of which there are two pairs above each chamber K, one lever for each of the four suspending-rods. The number of rods and levers may of course be varied, but four will be found advantageous. Rubber washers $g^7$ are placed beneath the lower ends of said links or couplings.

Each of the rods $d'$ is furnished with an adjustable block or stop, $g^5$, as shown in Fig. 15, which is secured at any suitable point upon the rod below the upper ring, $a'$, so that as the levers $d$ $e$ rise the lower ring, $a^3$, and consequently the lower frame, will rise independently of the upper ring until the blocks or stops $g^5$ strike the latter and carry it and the upper frame upward with them. By this arrangement the filtering-cloth B is first slackened and thereby shaken, which tends to throw off adhering particles. Then the upper frame is suddenly jarred. Then the action is reversed by the descent of the levers $d$ $e$, the upper frame coming suddenly against the nuts $g^6$ of rods $g^{11}$, while the lower frame, continuing to descend, suddenly straightens out and stretches the filtering material, thereby forcibly throwing off adhering matter not thrown off in the upward movement. By the action thus described the filtering-cloth is thoroughly and quickly cleaned, particularly as the jarring action is repeated at short intervals. The rubber or elastic washers $g^7$ and $g^8$ prevent the jar and noise that would otherwise occur when the filters A are thus shaken.

Figure 20:
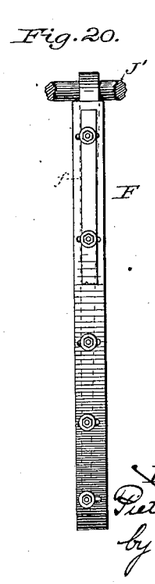

Beneath each filter A is a traveling curved scraper, F, (shown separately in Fig. 20,) which, being secured to the revolving vertical shaft J', sweeps around over the floor of the filter-chamber, and by reason of its curved form crowds or presses the dust which falls down from the filter outward through a side opening or outlet, G, Figs. 15 and 16, into a spout, H, leading to a box or receptacle, I. This curved scraper F consists of a blade or strip of india-rubber clamped or secured to an iron arm or bar, $f$, in such manner as to permit it to be readily adjusted or set down to compensate for wear. This may be conveniently done by clamping the rubber between the bar and a thin strip of metal, elongated holes being formed in the rubber to permit adjustment. The outlet G is provided with a hinged valve, $g$, Figs. 15 and 16, which keeps said opening normally closed and prevents interference with the working air-currents of the apparatus, but which will open or close automatically, according to the direction of the air-current.

For the purpose of producing the necessary motion of the levers $d\ e$, by which the filter is jarred, said levers are arranged in pairs, with their inner ends overlapping and one resting upon a lateral projecting portion of the other, as in Figs. 4 and 5, and a divided horizontal shaft, Y Y', is carried across the top of the chamber K and provided with cams $b'\ c'$, which, as the shaft rotates, bear upon and depress the inner end of the upper one of the said levers, which carries the lower one down with it. As the cams ride off the ends of levers $d$, the inner ends of the levers rise and the outer ends fall, permitting the filter A to fall to its normal position, as above explained.

Each filter-chamber K is provided with a set of levers $d\ e$ and their attendant mechanism, so that each is operated independently of the others. There is, therefore, a series of shafts Y Y', each of which is furnished with a chain-wheel, T, and all of said chain-wheels receive motion from a driving-chain, S, passing up one side and down the other, as indicated by dotted lines in Fig. 1 and in full lines in Fig. 2; or it may be arranged to pass alternately to one and the other side of the chain-wheels, in which latter case it will of course be necessary to have the cams of each alternate shaft Y Y' reversed in form from what is shown in the drawings.

In some cases it will be found necessary to provide additional hoops for the rings of filters, and to attach the rods $d'\ e'$ thereto, as at $a^{10}$, Fig. 4. This, however, is a matter of judgment dependent upon the size of the filters and like considerations.

In course of time the filters will clog up and the working of the apparatus will be impaired, notwithstanding the jarring action above described; hence I provide means for producing a reverse air-current, so that the moisture brought into the apparatus by the dusty-air current may be dried up or driven off. It is important that in thus providing for a reverse air-current care be taken to prevent the whole machine, or the main portion thereof, from being thrown out of action at one time, because that would involve a great loss of time and interfere with the continuity of the process, which interference might involve serious consequences. I therefore provide each filter-chamber with valves independent of those of every other chamber, so constructed, arranged, and timed in their action that only one of the filters shall be inoperative at any time. The construction and arrangement of parts by which this result is attained will now be explained.

Figure 6:
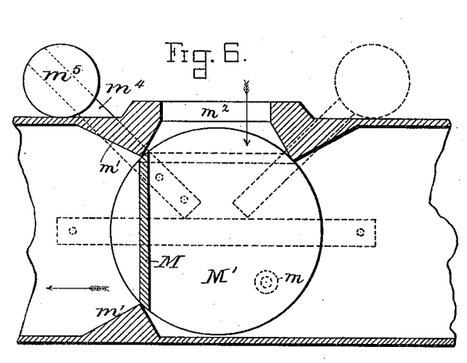
Figure 7:
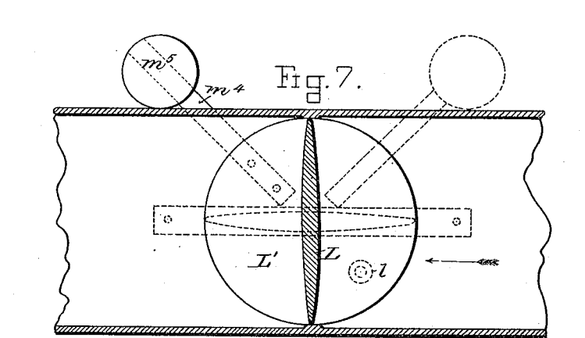
Figure 9:
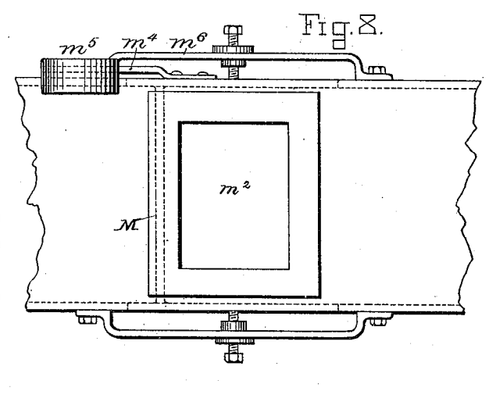
Figure 10:
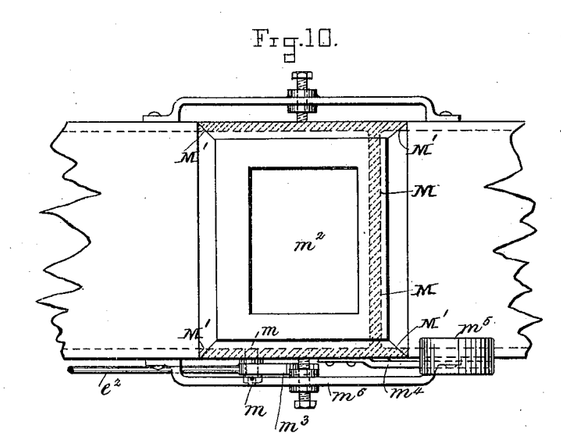
Figure 11:
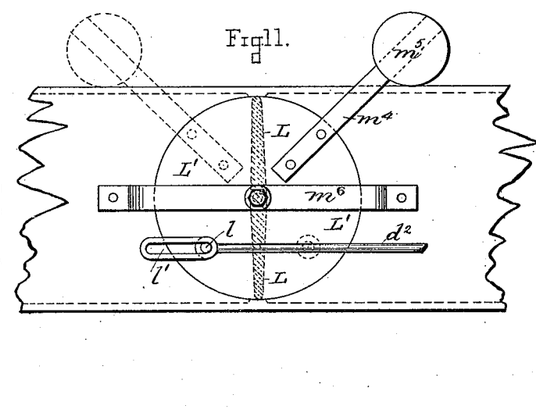
Figure 12:
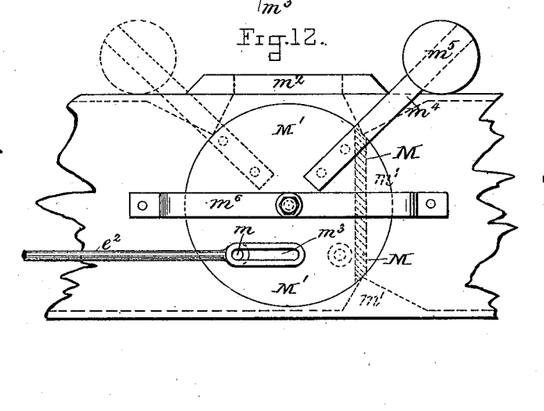

As shown in Figs. 1, 2, 3, and 18, there is at one side of the apparatus a vertical trunk, D, which communicates with all of the horizontal trunks R, and receives the dusty air from a trunk or spout, Q, while at the opposite side is a similar exit trunk, E, likewise in communication with the trunk R, but with the outlet ends thereof, said trunk E being in communication with a fan, P, which draws the air through the filters. The trunk D is furnished with a series of valves, L, one in the mouth of each horizontal trunk R, and serving to permit or prevent communication between the said trunk D and any of the trunks R, as may be desired. In like manner the exit ends of the trunks R are furnished with valves M, which control communication between the trunks R and the trunk E, and also serve to control communication between the trunk R and a third upward trunk, Z, which receives air from a fan or other air-forcing apparatus, N, Figs. 2 and 3. The valves L and M each consist of a thin board or plate of proper size to close the openings communicating with the respective trunks, and provided at each side of the trunk with circular heads or disks, L' M', which are seated closely in circular openings in the sides of the trunks R. Under this construction, it will be observed it is only necessary to turn the circular disks or heads L' M' a quarter-turn in one or the other direction to fully open or close the passage-way through trunk R. The outlet ends of trunk R are formed with openings $m^2$, which are shown at the upper side, but may be located at any other side as well. The openings $m^2$ control communication with the spout Z, through which an air-current is designed to enter trunk R at certain times, but only when the inlet and outlet valves between trunks R and D and E are closed. In order to adapt the valves M to control both the main outlets of the trunks R and the openings $m^2$, the boards or plates thereof are set out of line with the center of the heads or disks M', as in Figs. 6, 12, and 18, occupying the position of a cord or line connecting the extremities of an arc of the circumference of said heads. The openings from and into the trunk R, at the discharge ends thereof, are slightly reduced by seatings $m'$, as shown in Figs. 6, 12, and 18, so that as the disks M' are rotated the board or plate is brought either transversely across the trunk R, or in line therewith, and across opening $m^2$, as shown in dotted lines in Fig. 6, and more clearly in Fig. 18, which shows the second filter from the top closed to the dusty-air current and opened to the warm-air current. In this way the closing of the outlet end of the spout R and the opening of the inlet $m^2$ are simultaneously performed.

The valves L and M are connected by rods $d^2$ $e^2$ with mechanism for automatically opening and closing them together, or nearly at the same time, so that as the inlet is closed the outlet is also closed, and an opportunity is afforded for the dust to settle in the particular chamber thus cut out, or so that when a fresh quantity of the dusty air is admitted an outlet is provided for the escape of the purified air. In practice it is desirable that the valve L should fully close before the valve M begins to close, and to open inlet $m^2$, as otherwise there might be interference of the two currents; and it is further desirable that valve L should remain closed until valve M fully opens the trunk R. Each valve has one of its heads provided with an arm, $m^4$, carrying a weight, $m^5$, as shown in Figs. 6 to 12, inclusive.

In Figs. 9, 10, 11, and 12 is illustrated one manner of connecting the operating-rods $d^2$ $e^2$ with the valves to cause the latter to operate in the way and in the order above mentioned. I make the rods $d^2$ and $e^2$, which work the valves L and M, with a slot, $l'$ $m^3$, at their ends, where they engage with the pins $l$ and $m$, by means of which they actuate the valves. The length and position of these slots are regulated, as shown, so that the movement of the rods $d^2$ and $e^2$ will completely close the valve to be shut at that time before opening the one to be opened. In the position shown in Figs. 11 and 12 the valve L is closed and the passage or port $m^2$ of the valve M is open for the admission of the clean, preferably heated, air.

The lever W, conveying motion to the rods $d^2$ and $e^2$, moves them in the direction required. The end wall of the slot $m^3$ engaging with the pin $m$ at once moves and carries the disk M' with the valve M around until the weighted balance-lever $m^4$ has reached the center, and carries the disk M' and the valve M the remainder of the distance it has to travel, and closes the passage $m^2$. By this time the rods $d^2$ $e^2$ will have just moved half the distance of their travel, and the outside end of the slot $l'$ will have just come in contact with the pin $l$. The disk L', carrying the valve L, is then carried round half the distance of its travel by the end of slot $l'$ engaging with the pin $l$, and the remainder of the distance by the weighted balance-lever $m^4$. When it is fully open, the pin $l$ by the same movement having been carried from one end of the slot $l'$ to the other end of same, abuts against the end of the slot, from which it will first receive motion when the direction of motion of the rods is reversed, the pin $m$ being free to slide in the slot $m^3$ until the rods have traveled half the length of their stroke, when a similar though reversed action to that above described takes place. The consequence is that the passage $m^2$ of the valve M, through which the clean or heated air enters is closed before the dusty-air admission-valve L is opened, when the rods are working in one direction, and the dusty-air admission-valve is closed before the passage $m^2$ of the valve M is opened, when they work in the other direction.

When the apparatus is at work, I find it very desirable that the filter should have a quiet moment between the time when the current of dusty air passes in at the valve L, and the time when the reverse current, preferably of heated air, enters at the valve M. The object of this quiet moment or short interval of time is to allow the dust to settle, as otherwise, when the motion gets slack, the two currents will be entering in opposite directions with the result of more firmly fixing the fibers of the stive in the filter cloth. It is during this interval of rest, when neither current is entering the filter and the pressure has equalized itself, that the shaking-gear above described, actuated through the clutch X, is brought into operation.

The construction of valve M allows both passages $m'$ and $m^2$ to be partially open for a short interval at the same time. This allows, while the passage $m'$ is being opened and before $m^2$ is closed, a small portion of hot air to pass through $m^2$ into the spout E, thus drying any moisture which may have collected in the spout E or exhaust-fan P.

It has already been stated that a shaft, Y Y', is carried across the top of each chamber or compartment K, for the purpose of actuating the shaking or jarring mechanism. Each of these shafts is furnished with a screw or worm, U, which meshes with the periphery-teeth of a worm wheel or disk, V, which disk is provided with two cam-grooves, $v$ and $w'$, as shown in Figs. 5 and 18. The groove $v$ receives an anti-friction roller, $v'$, or a stud projecting downward from the pivoted lever W, which gives motion to the rods $d^2$ $e^2$, as before mentioned, and groove $w'$ gives motion to a lever, $w$, through a stud or roller, $w^2$, thereon, said lever carrying at one end a clutch-sleeve, X, which, when thrown forward or inward toward the center of the machine, Fig. 5, connects the two sections Y and Y' of the shaft, and causes the cams or tappets $b'$ $c'$ to actuate the levers $d$ and $e$, and thus to jar the filter. The cam-grooves $v$ and $w'$ are of such form relatively that the jarring action takes place only when the valves L and M are closed against the entrance or exit of the dust-laden current, thus causing the filter operated upon to be relieved from the action of the main current, which would tend to make the particles continue to adhere to the filter. The inlet $m^2$ being open at this time, a reverse current of warm air passing through the meshes of the filter under the pressure of fan N serves to detach or aid in detaching such adhering particles. Before the valves are again opened the clutch X is withdrawn, and the filter is permitted to resume its normal position and to come to rest.

Figure 19:
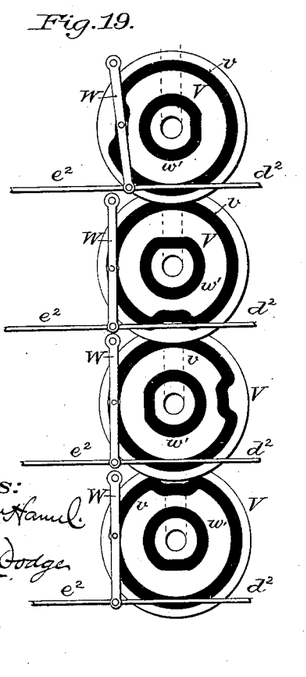
Fig. 19, a diagram illustrating the relative positions of the cam-wheels controlling the valves and shaking devices, and Fig. 20 an enlarged view of the scraper.

The cam wheels or disks V are set in such relation to each other that no two shall operate at the same time upon the mechanism which they control. Thus, if there be six filters and a corresponding number of disks, a given point of each disk being taken as a starting-point, the same point of each succeeding disk of the series will be set sixty degrees farther around from a common vertical starting-line; hence during the first sixth of a revolution the first disk will actuate the device under its control, then the second disk will actuate its mechanism, and so on throughout the series, and again to the first. In this way all but one of the filters are kept constantly in action, and there is no variation in the power required or in the force of the air-currents. The diagram, Fig. 19, illustrates this idea, and shows four cam-plates set at ninety degrees relatively to each other.

The shaking-gear is disconnected just before the valves are opened.

The valve M, in opening the inlet $m^2$, allows a small quantity of hot air to escape into trunk E and to dry the moisture therein or in the fan P. The return-current of heated or dry air, laden with such particles as it may have collected, passes out of the filter into the spout H through side hole, G, down into the box or accumulator, I, through a spout, $i^5$, preferably of flexible cloth, and weighted by a wooden ring, $i^6$, at the lower end. With this construction a reversal of the air-current causes the sides of the spout to flap together and spread apart, and thus adhering matter is loosened and shaken off. This box I is constructed with sides $i$, formed of very porous flexible cloth secured to the frame-work $i^2$, without stretching of the cloth, so that it is somewhat baggy, and so arranged that as each return-current passes into the box I the sides bulge out in the manner shown by dotted lines $i^3$. When the valves are reversed, the sides $i$ are drawn inward, shaking off the adhering dust in the same manner as is done in flipping a towel or duster. The dust, &c., falls into the bottom of the box, and is discharged therefrom by Archimedean screws $i^4$.

In very hot and dry climates air may be taken directly from the atmosphere and forced by a fan, N, into the filtering-chamber K, for the purpose of drying or removing any moisture therein and of cleaning the meshes of the screening material by traveling in a reverse direction from the ordinary current. In damp climates, and, in fact, in nearly all climates, I prefer to heat the air thus carried into the apparatus, thereby increasing its drying capacity. For this purpose I provide a heater (shown in Figs. 1 and 3) consisting of a casing or chamber, O, provided with an air-inlet, a spout or trunk communicating with fan N, a valve, $o'$, in said trunk to regulate the volume of air admitted to the fan, and a steam-coil, $o$, to heat the air entering the chamber O. The air is thus dried and somewhat heated before entering the chamber K, into which it is forced by the fan N, and from which it escapes through outlet-valves G into spout H, from which it descends into the chest I.

It is known that electricity will attract small pieces of fibers, such as pieces of paper and pieces of bran, &c. I have found that it takes three or four months' working before sufficient attractive power is collected in the filter to make it retain these small fibers. When advanced so far, neither the shaking nor the back blast are able to remove those particles from the filter. The filter-cloth under the above construction, coming frequently into contact with the copper or brass wire cage C, (which is a good conductor and is electrically joined or connected in any convenient manner with the iron rings $a$ $a'$ $a^2$ $a^3$, and further with the other mechanism of the machine,) will prevent the collection of attractive power in the filter by dissipating or conducting off the electricity.

Having thus described my invention, what I claim is—

1. In a filtering apparatus, the combination of a series of independent filters, a dusty-air supply-trunk and an outlet-trunk and a warm-air trunk, each common to all the filters, valves controlling communication between the dusty-air trunk and the filters, and valves controlling communication between the outlet and warm-air trunks and the filters, substantially as shown and described, whereby any filter of the series may be closed to the dusty-air and outlet trunks and opened to the warm-air trunk.

2. In an air-filtering apparatus, the combination of a filter, an inlet for dusty air, an outlet for purified air, an inlet for warm air, a valve for controlling the dusty-air inlet, and a valve common to the purified-air outlet and warm-air inlet, and adapted to simultaneously open one and close the other.

3. The combination, substantially as described and shown, of casing K, a filter located within said casing, trunk R, provided with inlet and outlet openings at its ends, and with an additional warm-air inlet, $m^2$, valve L, controlling the main inlet, and valve M, constructed and arranged substantially as shown and described, to simultaneously open the inlet $m^2$ and close the outlet or open the outlet and close the inlet $m^2$.

4. In an air-filtering apparatus, the combination of a series of filtering-chambers, a trunk communicating with a dusty-air supply-spout, and by separate passages with the respective filtering-chambers, valves interposed between said trunk and the respective chambers, a second trunk communicating independently with the respective chambers and serving as an outlet therefor, a third trunk likewise communicating independently with the respective chambers, and with a heating apparatus and independent valves, each common to the second and third trunks, and serving to close the outlet and open the warm-air inlet, or to close the warm-air inlet and open the outlet, substantially as set forth.

5. The combination, with a filtering apparatus, of a hot-air apparatus, air-passages, and valves, substantially as described, by which hot air can be forced through the filter in a contrary direction to that taken by the dusty air when being filtered.

6. The combination of a filter, a dusty-air inlet therefor, an outlet for purified air, air-passages from the inlet to the outlet, a warm-air inlet, a valve controlling the dusty-air inlet, a valve common to and controlling the air-outlet and warm-air inlet, and a connecting device between said valves, adapted to first completely close the dusty-air inlet, then to close the outlet-valve and open the warm-air-inlet valve, substantially as shown and described.

7. The combination of a filter, a dusty-air inlet therefor, an outlet for purified air, a warm-air inlet, a valve for controlling the dusty-air inlet, a valve common to and controlling the air-outlet and warm-air inlet, and a connecting device between said valves, adapted, substantially as explained, to first close the dusty-air inlet-valve, then to close the outlet-valve and open the warm-air inlet-valve, next to close the warm-air inlet-valve and open the outlet-valve, and, finally, to open the dusty-air inlet-valve.

8. The combination, substantially as described and shown, of chamber K, filter A, mounted therein, dusty-air trunk D, valve L, controlling communication between trunk D and chamber A, outlet trunk E, valve M, controlling communication between trunk E and chamber A, connecting-rods $d^2$ $e^2$, having a sliding connection with the valves, and means, substantially such as described, for reciprocating said rod.

9. In combination with a series of independent filters, a common air-supply trunk, and a series of jarring or shaking devices, one for each filter, constructed and arranged substantially as shown and described, to come into operation successively, whereby the shaking action is confined to one filter at a time.

10. In combination with a series of filters, A, and supporting rods therefor, a rotary shaft for each filter, provided with cams to lift the rods and filters, and a driving-chain common to all the shafts, substantially as and for the purpose set forth.

11. The combination, in a filtering apparatus, of a suspended filter, valves, and operating mechanism, such as described and shown, a divided shaft carrying cams to lift and drop the filter, a clutch to connect and disconnect the two parts of the shaft, and a worm, a cam-plate rotated by said worm and having two independent cam-grooves and two independent levers, each having a stud working in a groove of said plate, said levers being connected, respectively, with the clutch and with the valve mechanism, substantially as described and shown.

12. In combination with chamber K, filters A and their suspending-rods, levers $d\,e$, trunks D E, and valves L M, shafts Y Y′, cams $b'$ $c'$, and clutches X, carried by said shafts, cam-plate V, provided with two cam-grooves, and levers W $w$, actuated by said cam-plate and connected, respectively, with the valves and the clutch, all substantially as described, and for the purpose set forth.

13. In combination with a filter, A, the shaking devices consisting of the stationary rods $g^{11}$, sustaining the upper part of the filter, the vertically-reciprocating rods $d'$ $e'$, carrying the lower part of the filter, and having stops $g^5$, by which means, when the rods $d'$ $e'$ are raised to near their full length, they lift the upper part of the filter and shake it also, substantially as described.

14. A dust-filtering chamber having a rigid frame and loose baggy sides of flexible filtering material, and thereby adapted to be moved and shaken by the intermittent passage of air-currents through it.

15. In combination with a dust-collector provided with means for producing an air-current through the same, and with valves for reversing said current, an outlet-spout, $i^5$, of flexible cloth, provided with a ring, $i^6$, at its lower end, substantially as and for the purpose explained.

16. In combination with a series of superimposed filtering-chambers, a discharge-spout at one side common to the several chambers, gravitating valves opening laterally from said chambers into the trough, and curved scrapers, arranged, substantially as shown and described, to sweep the floors of the respective chambers and force the material therefrom through the lateral openings.

17. In an air-filter, the combination of the metal rings $a$ $a'$ $a^2$ $a^3$, with the two sets of spokes or bars $a^5$ $a^6$, alternating with each other, and the filtering-cloth stretched around one set and secured to the other, and cloth end pieces, as described.

18. In a filter for filtering air, in combination with a cloth surface, metallic electrical conductors in intimate contact with the cloth, by which means the electricity is carried off as formed, and prevented from attracting light material.

19. In a filter, the combination, with two flexible filtering-surfaces, of an intermediate perforated cage adapted to prevent the contact of said surfaces and to permit a free passage of air at all times through and between each.

In testimony whereof I have signed my name to this specification in the presence of two subscribing witnesses.

PIETER VAN GELDER.

Witnesses:
W. P. THOMPSON,
I. O. O'BRIEN.